(12) United States Patent
Takahashi et al.

(10) Patent No.: US 9,363,466 B2
(45) Date of Patent: Jun. 7, 2016

(54) IMAGE PROCESSING DEVICE FOR DETERMINING AN ORIENTATION AND A DIRECTION OF THE IMAGE PROCESSING DEVICE

(75) Inventors: Masaki Takahashi, Kanagawa (JP); Yoshihiko Suwa, Kanagawa (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 14/119,286

(22) PCT Filed: Apr. 5, 2012

(86) PCT No.: PCT/JP2012/002406
§ 371 (c)(1),
(2), (4) Date: Nov. 21, 2013

(87) PCT Pub. No.: WO2012/164807
PCT Pub. Date: Dec. 6, 2012

(65) Prior Publication Data
US 2014/0092278 A1    Apr. 3, 2014

(30) Foreign Application Priority Data
Jun. 3, 2011    (JP) ................................ 2011-125654

(51) Int. Cl.
*H04N 5/91*    (2006.01)
*H04N 1/32*    (2006.01)
(Continued)

(52) U.S. Cl.
CPC ............. *H04N 5/91* (2013.01); *H04N 1/00323* (2013.01); *H04N 1/32128* (2013.01);
(Continued)

(58) Field of Classification Search
None
See application file for complete search history.

(56) References Cited

U.S. PATENT DOCUMENTS 8,928,696 B1 * 1/2015 Yang ...................... G01C 25/00
345/659
2003/0174307 A1   9/2003 Kalinski et al.
(Continued)

FOREIGN PATENT DOCUMENTS

CN    101930780    12/2010
EP    1 345 422    9/2003
(Continued)

OTHER PUBLICATIONS

International Search Report dated May 1, 2012 from the corresponding PCT/JP2012/002406.
(Continued)

*Primary Examiner* — Albert Cutler
(74) *Attorney, Agent, or Firm* — Katten Muchin Rosenman LLP

(57) ABSTRACT

When an accepting section 102 accepts an order to acquire image data, an image data acquirer 104 acquires image data from a memory section 130 and compresses it in the JPEG format. An orientation identifier 122 identifies orientation information of an image processing device 10 by using a detection value of an acceleration sensor. A direction identifier 124 identifies the azimuthal angle of a lens optical axis by using a detection value of a geomagnetic sensor and orientation information identified by the orientation identifier 122. If it is determined by the orientation identifier 122 that the image processing device 10 is in a horizontal orientation, the direction identifier 124 identifies the azimuthal angle of the lens optical axis from a predetermined direction in the image processing device 10 and the detection value of the geomagnetic sensor without using the lens optical axis direction.

5 Claims, 6 Drawing Sheets

(51) Int. Cl.
  *H04N 1/00* (2006.01)
  *H04N 9/82* (2006.01)
  *H04N 5/77* (2006.01)
  *H04N 9/804* (2006.01)
  *H04N 5/907* (2006.01)
  *H04N 5/232* (2006.01)

(52) U.S. Cl.
  CPC .............. *H04N 5/772* (2013.01); *H04N 5/907* (2013.01); *H04N 9/8042* (2013.01); *H04N 9/8205* (2013.01); *H04N 5/232* (2013.01); *H04N 2201/0084* (2013.01); *H04N 2201/3225* (2013.01); *H04N 2201/3254* (2013.01); *H04N 2201/3274* (2013.01)

(56) References Cited

U.S. PATENT DOCUMENTS

| | | |
|---|---|---|
| 2004/0212699 A1 | 10/2004 | Molgaard |
| 2006/0039693 A1* | 2/2006 | Lee et al. ........................ 396/322 |
| 2006/0156565 A1* | 7/2006 | Linjama ............................ 33/356 |
| 2009/0086047 A1* | 4/2009 | Suehiro ....................... 348/222.1 |
| 2010/0002015 A1* | 1/2010 | Handa ............................ 345/650 |
| 2010/0321406 A1 | 12/2010 | Iwase et al. |
| 2010/0329653 A1 | 12/2010 | Kurosawa |
| 2011/0090244 A1* | 4/2011 | Pantfoerder .................. 345/619 |
| 2014/0298234 A1 | 10/2014 | Iwase et al. |

FOREIGN PATENT DOCUMENTS

| | | | |
|---|---|---|---|
| EP | 2 267 716 | | 12/2010 |
| JP | 08-129216 | | 5/1996 |
| JP | 09-247512 | | 9/1997 |
| JP | 2003-051997 | | 2/2003 |
| JP | 2005-110031 | A | 4/2005 |
| JP | 2007-074077 | A | 3/2007 |
| JP | 2007074077 | * | 3/2007 |
| WO | 2007/055335 | | 5/2007 |

OTHER PUBLICATIONS

"Exchangeable image file format for digital still cameras: Exif Unified Version 2.3," Japan Electronics and Information Technology Industries Association (JEITA) and Camera & Imaging Products Association, Apr. 2010, the Internet <URL: http://www.jeita.or.jp/cgi-bin/standard_e/pdfpage.cgi?jk_n=47>.

International Preliminary Report on Patentability dated Dec. 19, 2013, from the corresponding PCT/JP2012/002406.

Japanese Office Action dated Mar. 10, 2015 from corresponding Application No. 2011-125654.

European Search Report dated Oct. 13, 2014 from corresponding Application No. 12793484.2.

Japanese Notification of Reason for Refusal dated Sep. 15, 2015 from corresponding Application No. 2011-125654.

Chinese First Office Action dated Feb. 1, 2016 from corresponding Application No. 201280024246.1.

* cited by examiner

FIG.4
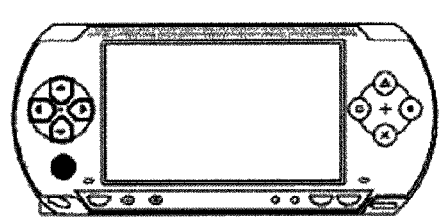
VERTICAL UPPER DIRECTION ↑
(a)
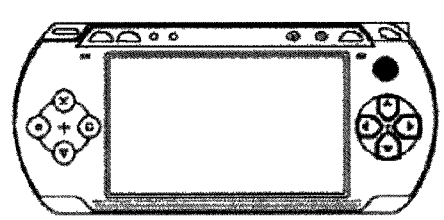
VERTICAL UPPER DIRECTION ↑
(b)
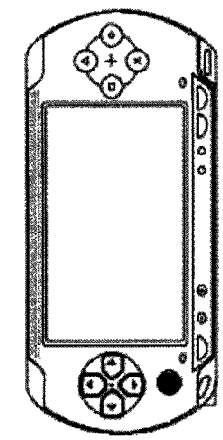
VERTICAL UPPER DIRECTION ↑
(c)
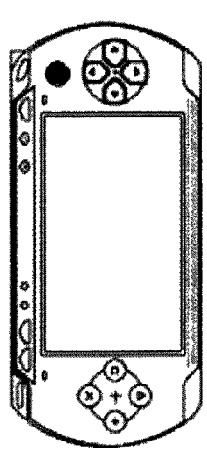
VERTICAL UPPER DIRECTION ↑
(d)
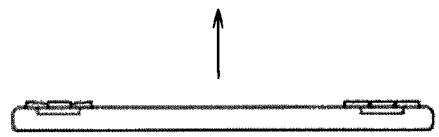
VERTICAL UPPER DIRECTION ↑
(e)
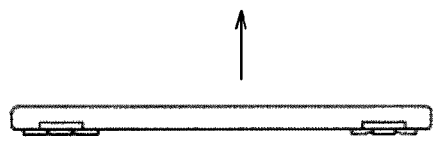
VERTICAL UPPER DIRECTION ↑
(f)

FIG. 5
(a) 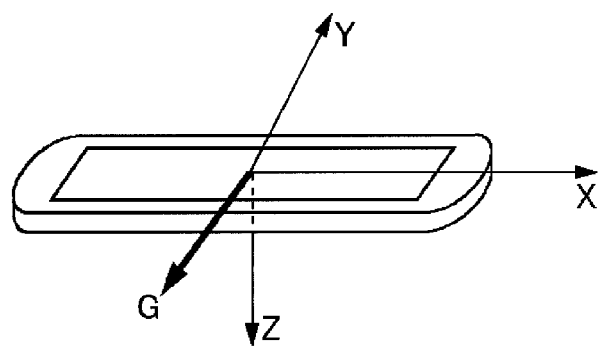
(b) 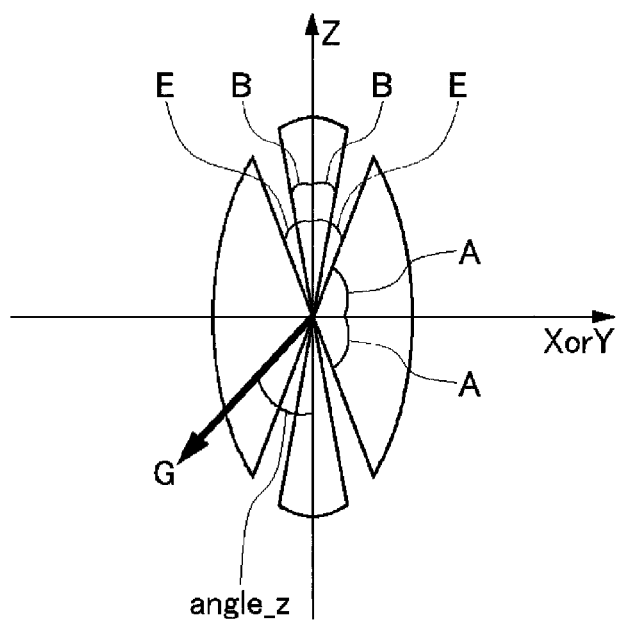
(c) 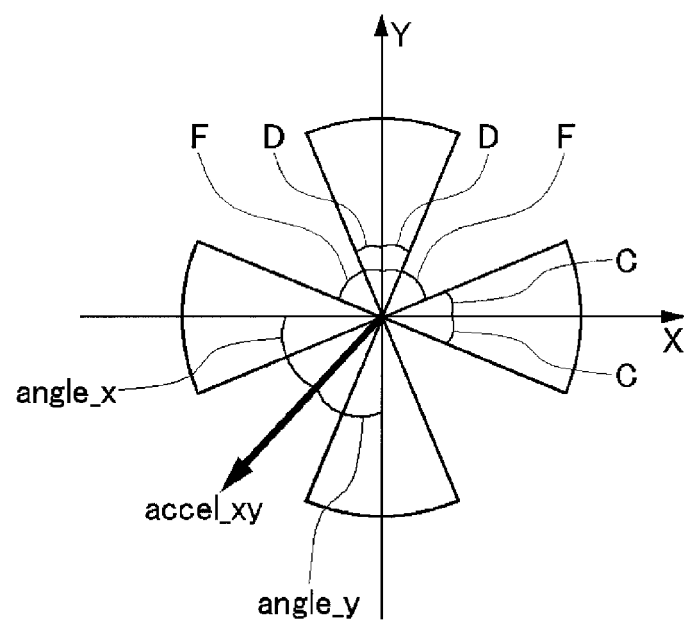

IMAGE PROCESSING DEVICE FOR DETERMINING AN ORIENTATION AND A DIRECTION OF THE IMAGE PROCESSING DEVICE

TECHNICAL FIELD

The present invention relates to a technique to generate an image file.

BACKGROUND ART

Pieces of small-size electronic apparatus, such as smartphones and portable game machines, are prevalent. In recent years, many pieces of electronic apparatus are equipped with an imaging controller and have functions of a so-called digital camera. In general, an image photographed by a digital camera is compressed in the JPEG (Joint Photographic Experts Group) file format to be recorded. When recording imaging data, the digital camera causes an image file to include an Exif (Exchangeable Image File Format) file including various pieces of attached information at the time of the photographing as well as the imaging data. A viewer analyzes the attached information included in the Exif file and displays the image on a display unit. The Exif standard has a background of being formulated as an image file format for the digital camera.

CITATION LIST

Non Patent Literature

[NPL1]
"Exchangeable image file format for digital still cameras: Exif Unified Version 2.3," Japan Electronics and Information Technology Industries Association (JEITA) and Camera & Imaging Products Association, April 2010, the Internet <URL: http://www.jeita.or.jp/cgi-bin/standard e/pdf-page.cgi?jk_n=47>

SUMMARY

Technical Problems

In the Exif file format, an area (GPSInfoIFD) in which measurement information of the GPS (Global Positioning System) is stored as information relating to the configuration of image data is set. In this area, a tag of the photographing direction (GPSImgDirection) indicating the direction in which the optical axis of the lens is oriented (azimuthal angle) is defined. In this tag, the photographing direction when the north is employed as the basis (0 degrees) is input in a range of 0 to 360 degrees.

If the optical axis of the lens is oriented in substantially the vertical direction at the time of photographing, variation occurs in the value input to the tag of the photographing direction (photographing direction information) depending on the accuracy of a geomagnetic sensor. Therefore, even if the orientation of the digital camera hardly changes, when plural pictures are photographed, different photographing direction information is often input to the respective tags of the photographing direction. So, the emergence of a technique enabling input of the photographing direction information with high accuracy is desired.

Furthermore, among pieces of electronic apparatus are ones having a function to photograph an image displayed on all or part of a display unit, i.e. a so-called "screen shot" photographing function. For example, by photographing a game screen as a screen shot to record it, the user can review the game scene later. Image data photographed as a screen shot does not require information on the photographing condition and so forth at the time of reproduction in many cases, and so far it has been deemed that this image data has little necessity of generation of an Exif file. Furthermore, even when an Exif file is generated, information of a reference value is input to the tag. Therefore, in some cases, a viewer cannot reproduce the screen shot in a proper state.

So, an object of the present invention is to provide a technique to properly generate an image file.

Solution to Problems

To solve the above-described problems, an image processing device of a certain mode of the present invention is an image processing device that generates an image file. The image processing device includes an accepting section that accepts an acquisition order of image data, an acquirer that acquires image data if the accepting section receives the acquisition order, and an orientation identifier that identifies the orientation of the image processing device by using a detection value of an acceleration sensor. The image processing device further includes a direction identifier that identifies the direction of the image processing device by using a detection value of a geomagnetic sensor and orientation information identified by the orientation identifier and a file generator that generates an image file in which direction information identified by the direction identifier is associated with the image data.

What are obtained by translating arbitrary combinations of the above-described constituent elements and expressions of the present invention among method, device, system, recording medium, computer program, and so forth are also effective as modes of the present invention.

Advantageous Effect of Invention

According to the image processing technique of the present invention, it becomes possible to properly generate an image file.

BRIEF DESCRIPTION OF DRAWINGS

FIG. 4 is a diagram for explaining orientations of the image processing device.

FIG. 5 is a diagram for explaining orientation identification processing by an orientation identifier.

DESCRIPTION OF EMBODIMENT

Figure 1:
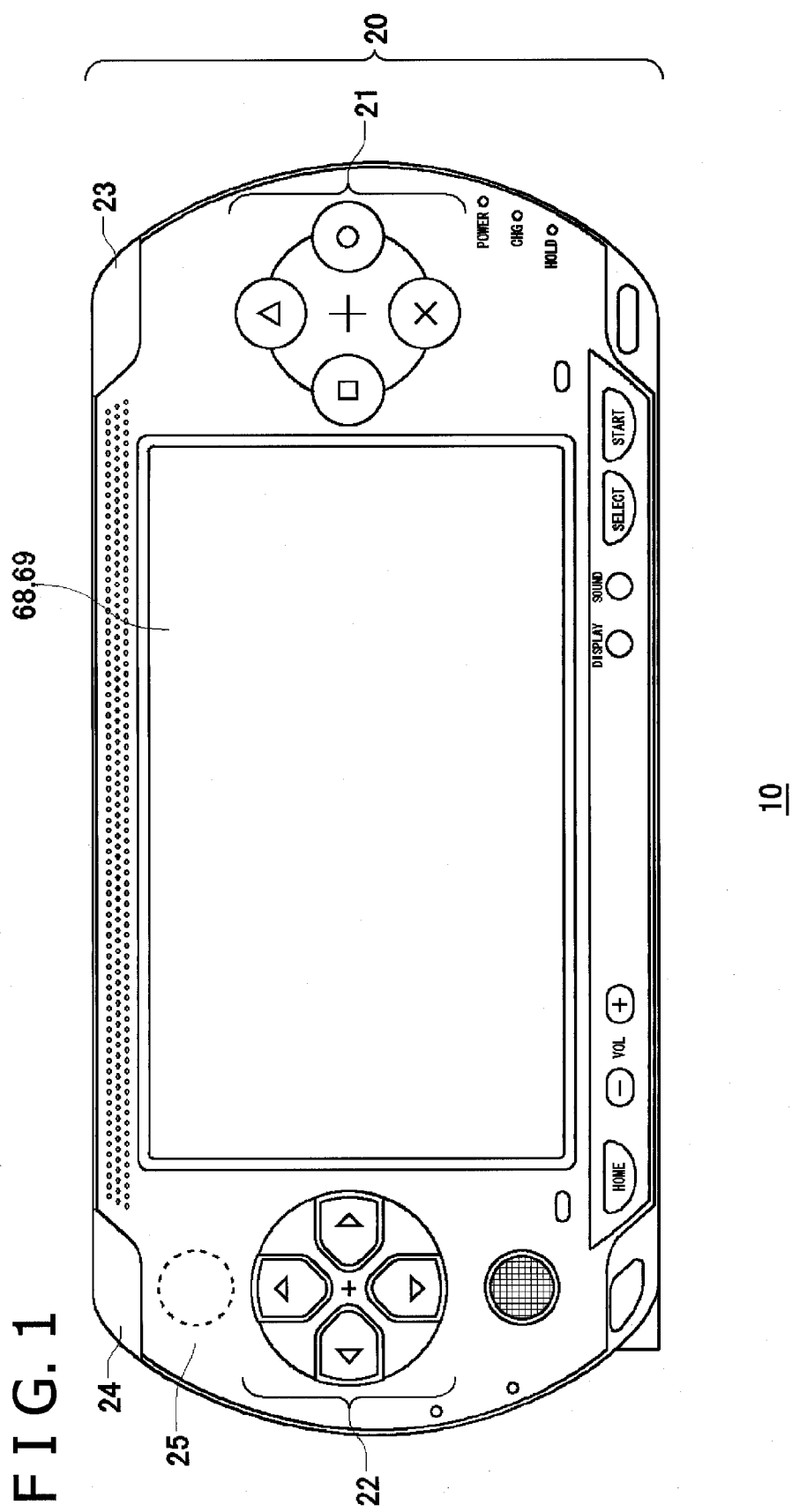
FIG. 1 is a diagram showing one example of the appearance of an image processing device according to an embodiment.

FIG. 1 shows one example of the appearance of an image processing device 10 according to an embodiment. The image processing device 10 has a chassis that is horizontally long and thin and has an outer shape of a substantially quadrangle. On the surface of the image processing device 10, an input device 20 including order input buttons 21, directional keys 22, an R button 23, an L button 24, and so forth and a display unit 68 are provided. With the display unit 68, a touch panel 69 for detecting contact by a finger of a user, a stylus pen, etc. is collocated. Furthermore, a touch panel is provided also on the back surface of the image processing device 10. At the side surface of the image processing device 10, a first slot for loading a recording medium such as a memory card and a second slot for loading a game cartridge in which a game program is recorded are provided. A motion sensor 25 to detect the motion of the image processing device 10 is provided inside the image processing device 10.

While grasping the image processing device 10 with both hands, the user can operate the order input buttons 21 with the right-hand thumb, operate the directional keys 22 with the left-hand thumb, operate the R button 23 with the right-hand index or middle finger, and operate the L button 24 with the left-hand index or middle finger for example. Furthermore, in the case of operating the touch panel 69, the user may operate the touch panel 69 with the respective thumbs while grasping the image processing device 10 with both hands. Alternatively, the user may operate the touch panel 69 with the right hand while grasping the image processing device 10 with the left hand.

The image processing device 10 of the present embodiment includes an imaging controller and has a camera function to photograph a subject. A lens of an imager for photographing a subject is provided on the back surface of the image processing device 10. When the image processing device 10 is in a photographing mode, a subject is displayed on the display unit 68 and a function of a shutter button is assigned to a predetermined button (e.g. R button 23) of the input device 20. The imager may be provided also on the front surface of the image processing device 10. Upon pressing of the R button 23 by the user, the imager images a subject and image data obtained by the imaging by the imager is recorded, in a recording medium loaded in the first slot, with an Exif file including various pieces of attached information at the time of the photographing as one image file.

Furthermore, the image processing device 10 of the present embodiment has a function to read out and run a game program from a game cartridge loaded in the second slot. When the user presses a HOME button in playing a game, a menu including an item of "screen shot" is displayed on the display unit 68. When the item of "screen shot" is tapped by the user, a screen shot of the game screen is photographed. For example, the function of the shutter button may be assigned to two buttons among the order input buttons 21 and a screen shot of the game screen may be photographed when the two buttons are simultaneously pressed.

Figure 2:
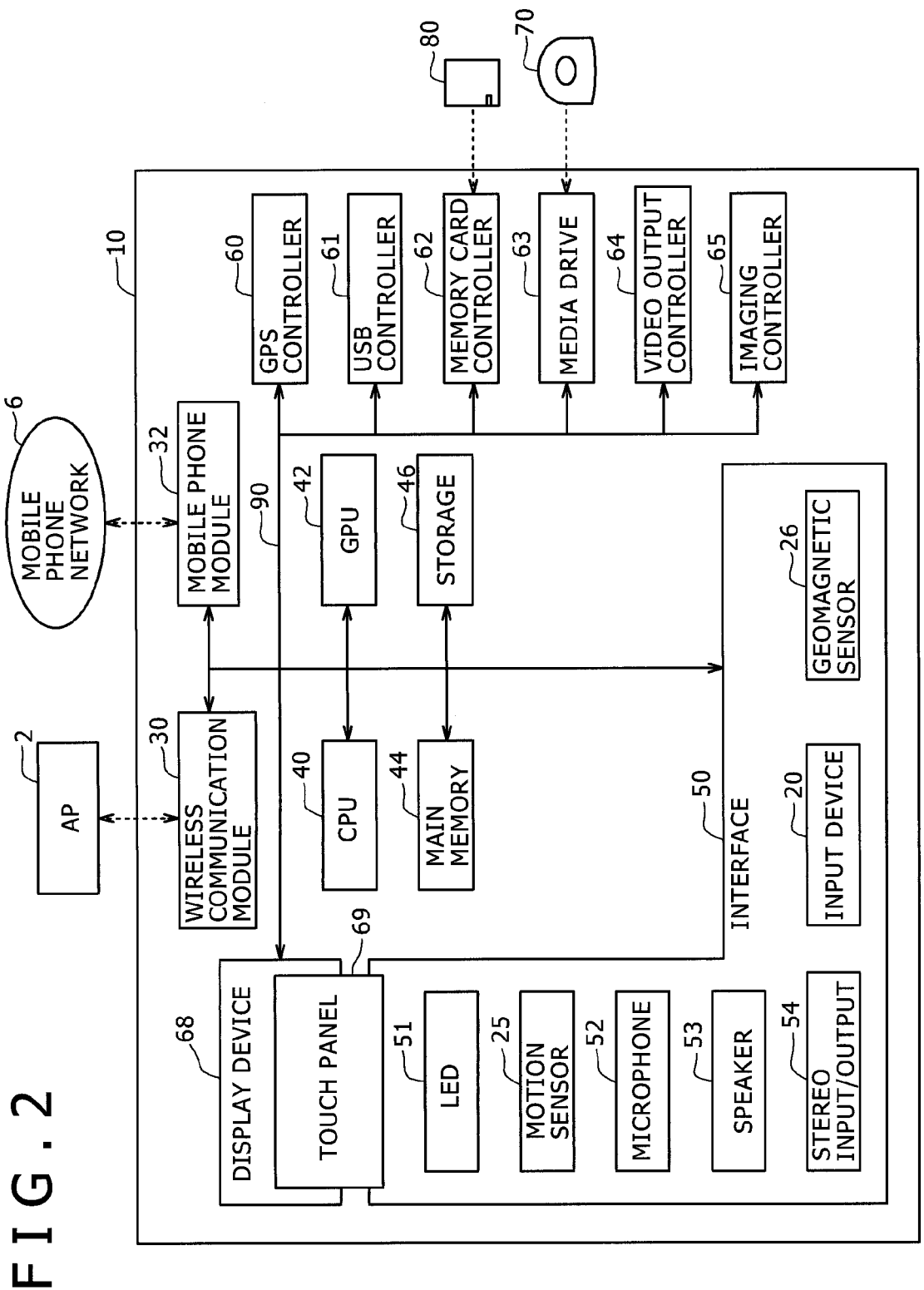
FIG. 2 is a functional block diagram of the image processing device.

FIG. 2 is a functional block diagram of the image processing device 10. The respective functional blocks may be connected to each other by a bus 90. The display unit 68 may be either a liquid crystal display device or an organic EL display device. The touch panel 69 is so provided as to be overlapped on the display unit 68 and detects contact by a finger of the user, a pen, etc. The touch panel 69 may be one based on any of systems such as resistive film system, surface capacitive system, and projected capacitive system. The display unit 68 and the touch panel 69 configure a quadrate display.

A wireless communication module 30 is formed of a wireless LAN module compliant with a communication standard such as IEEE 802.11b/g and connects to an external network via an AP (access point) 2. A mobile phone module 32 is compatible with a 3G (3rd Generation) digital mobile phone system compliant with the IMT-2000 (International Mobile Telecommunication 2000) standard defined by the ITU (International Telecommunication Union) and connects to a mobile phone network 6. In the mobile phone module 32, a SIM card in which a unique ID number for identifying the phone number of the mobile phone is recorded is inserted.

In an interface 50, an LED (Light Emitting Diode) 51 blinks when the wireless communication module 30, the mobile phone module 32, or the like is transmitting/receiving data. The motion sensor 25 detects the motion of the image processing device 10 and a geomagnetic sensor 26 detects terrestrial magnetism of three-axis directions. A microphone 52 inputs ambient sounds of the image processing device 10. A speaker 53 outputs sounds generated by the respective functions of the image processing device 10. A stereo input/output terminal 54 inputs stereo sounds from an external microphone and outputs stereo sounds to an external headphone and so forth. The input device 20 includes the above-described operation keys and so forth and accepts operation inputs of the user.

A CPU (Central Processing Unit) 40 runs a program or the like loaded into a main memory 44. In the present embodiment, it runs picture photographing application, screen shot photographing application, game, etc. A GPU (Graphics Processing Unit) 42 executes the calculation necessary for image processing. The main memory 44 is formed of a RAM (Random Access Memory) or the like and stores programs, data, etc. to be used by the CPU 40. A storage 46 is formed of a NAND-type flash memory or the like and is utilized as a built-in auxiliary storage device.

A GPS controller 60 receives signals from GPS satellites to calculate the present location. A USB controller 61 controls communications with peripheral devices connected by the USB (Universal Serial Bus). A video output controller 64 outputs a video signal to an external display device based on a standard such as the HDMI. A memory card controller 62 controls data reading/writing with a recording medium 80 such as a flash memory loaded in the first slot. When the removable recording medium 80 is loaded in the first slot, the recording medium 80 is utilized as an external auxiliary storage device. A media drive 63 is provided in the second slot, in which a game cartridge 70 in which a game file is recorded is loaded, and controls data reading/writing with the game cartridge 70. An imaging controller 65 images a subject and generates digital image data.

Figure 3:
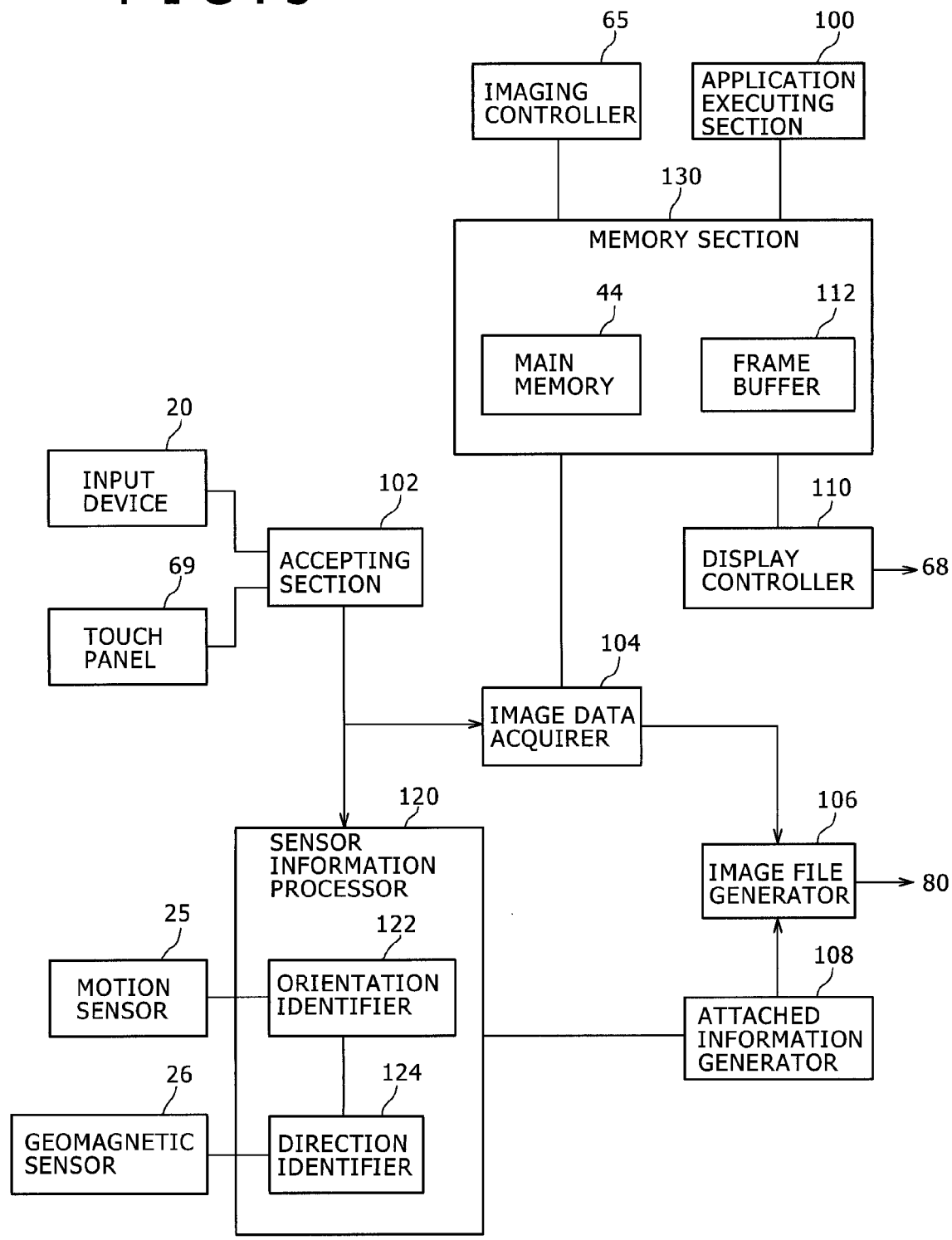
FIG. 3 is a diagram showing functional blocks for realizing an image file generating function in the image processing device.

FIG. 3 shows functional blocks for realizing the image file generating function in the image processing device 10. Although the configuration shown in FIG. 3 is realized by a CPU of an arbitrary computer, a memory, a program loaded in the memory, and so forth in terms of the hardware component, here functional blocks realized by cooperation of them are represented. Therefore, it is understood by those skilled in the art that these functional blocks can be realized in various forms by only hardware, only software, or a combination of them.

The image processing device 10 includes the imaging controller 65 and an application executing section 100 as a configuration for generating an image displayed on the display unit 68. When the photographing mode is set, the imaging controller 65 realizes the camera function and the image processing device 10 operates as a digital camera. Furthermore, when the application mode is set, the application executing section 100 executes an application of a game, etc. A memory section 130 has the main memory 44 and a frame buffer 112. A display controller 110 outputs image data buffered in the frame buffer 112 to the display unit 68.

The imaging controller 65 has the imager including a lens, a diaphragm to adjust the light amount, and an imaging element formed of CCD, CMOS, etc. Photosensors are planarly arranged on the light receiving surface of the imaging element, and a subject image formed on the light receiving surface of the imaging element is converted to a signal charge of an amount according to the amount of incident light by the respective photosensors. The imaging element outputs the accumulated signal charge to an analog signal processor, and the analog signal processor generates image data of signals of the respective colors of R, G, and B to output it to an A/D converter. The image data converted to a digital signal by the A/D converter is subjected to digital processing of gamma correction and so forth and then is stored in the main memory 44. The imaging controller 65 generates image data for displaying from the image data stored in the main memory 44 and supplies it to the frame buffer 112. The image data stored in the frame buffer 112 is output from the display controller 110 to the display unit 68 to be displayed.

The imaging controller 65 executes the above processing with a predetermined cycle. Due to supply of the image data for displaying to the display unit 68 with the predetermined cycle, the subject image obtained by imaging by the imager is displayed on the display unit 68 as a moving image. At this time, when the user presses the predetermined shutter button, an image data acquirer 104 acquires image data expanded on the main memory 44 and compresses it in accordance with e.g. the JPEG format. The image data acquirer 104 may acquire and compress image data expanded on the frame buffer 112. The image data acquirer 104 may be formed as one function of the imaging controller 65.

The application executing section 100 runs a game program and generates game images according to operation inputs of the user. Specifically, the application executing section 100 sets a virtual camera in a virtual three-dimensional game space and moves the virtual camera in accordance with operation inputs of the user to generate game images projected from the virtual camera to a virtual screen. The generated game image data is supplied to the frame buffer 112 to be output from the display controller 110 to the display unit 68 and provided to the user as a moving image. At this time, if the user makes a menu including an item of "screen shot" be displayed on the display unit 68 and taps the item of "screen shot," the image data acquirer 104 acquires image data expanded on the frame buffer 112 and compresses it in accordance with the JPEG format.

A sensor information processor 120 identifies the orientation of the image processing device 10 and the photographing direction of the imager (azimuthal angle of the lens optical axis direction) based on detection values of various kinds of sensors. The sensor information processor 120 includes at least an orientation identifier 122 that identifies the orientation of the image processing device 10 and a direction identifier 124 that identifies the photographing direction of the imager. The orientation identifier 122 identifies the orientation of the image processing device 10 by using a detection value of a three-axis acceleration sensor included in the motion sensor 25 in the picture photographing mode or the screen shot photographing mode.

FIGS. 4(a) to 4(f) show six basic orientations of the image processing device 10. In the diagram, the direction from the lower side to the upper side indicates the vertical upper direction. The orientation identifier 122 identifies the orientation of the image processing device 10 as one of the six orientations shown in FIGS. 4(a) to 4(f) by using the detection value of the acceleration sensor. FIG. 4(a) shows a lateral (LANDSCAPE) orientation. FIG. 4(b) shows a lateral upside-down (LANDSCAPE_UPSIDE_DOWN) orientation. FIG. 4(c) shows a longitudinal left-down (PORTRAIT_LEFT_DOWN) orientation. FIG. 4(d) shows a longitudinal right-down (PORTRAIT_RIGHT_DOWN) orientation. In the normal use state, the user grasps the image processing device 10 with the lateral orientation shown in FIG. 4(a) and operates it. The orientation identifier 122 determines the orientations shown in FIGS. 4(a) to 4(d) as an "inclined orientation." The inclined orientation also includes upright orientations with which the direction perpendicular to the chassis surface is perpendicular to the vertical direction.

Furthermore, FIG. 4(e) shows a face-up (FACE_UP) orientation and FIG. 4(f) shows a face-down (FACE_DOWN) orientation. For example, in a state in which the image processing device 10 is put on a table, the image processing device 10 takes the face-up orientation or the face-down orientation. The orientation identifier 122 determines the orientations shown in FIGS. 4(e) and 4(f) as a "horizontal orientation."

The orientation identifier 122 determines whether the image processing device 10 is in a horizontal orientation or an inclined orientation by using the detection value of the three-axis acceleration sensor. When determining that the image processing device 10 is in a horizontal orientation, the orientation identifier 122 identifies whether it is in the face-up orientation or the face-down orientation of the horizontal orientations. Furthermore, when determining that the image processing device 10 is in an inclined orientation, the orientation identifier 122 identifies whether it is in the lateral orientation, the lateral upside-down orientation, the longitudinal left-down orientation, or the longitudinal right-down orientation of the inclined orientations.

FIG. 5 is a diagram for explaining orientation identification processing by the orientation identifier 122. FIG. 5(a) shows the X, Y, and Z-axes set for the image processing device 10. In this example, the X-axis is set along the longitudinal direction of the image processing device 10. The Y-axis is set along the shorter-side direction. The Z-axis is set along the direction perpendicular to the surface. The X-axis positive direction is set to the direction from the left side to the right side of the image processing device 10. The Y-axis positive direction is set to the direction from the lower side to the upper side of the image processing device 10. The Z-axis positive direction is set to the direction from the front to the back of the image processing device 10. The Z-axis is parallel to the optical axis of the imager (lens).

G shown in FIG. 5(a) indicates the vector of the gravitational acceleration applied to the image processing device 10. The gravitational acceleration vector is oriented in the vertical lower direction and the three-axis acceleration sensor of the motion sensor 25 detects the X-axis component, Y-axis component, and Z-axis component of the gravitational acceleration vector G. Hereinafter, the three-axis components of the gravitational acceleration vector G will be expressed as (gx, gy, gz). Furthermore, the angle formed by the gravitational acceleration vector G and the Z-axis will be expressed as (angle_z). In addition, the angle formed by the X-axis and a vector accel_xy obtained by projecting the gravitational acceleration vector G on the XY-plane will be expressed as (angle_x), and the angle formed by the vector accel_xy and the Y-axis will be expressed as (angle_y). These angle_x, angle_y, and angle_z each take a value that is at least 0 degrees and at most 90 degrees.

Figure 6:
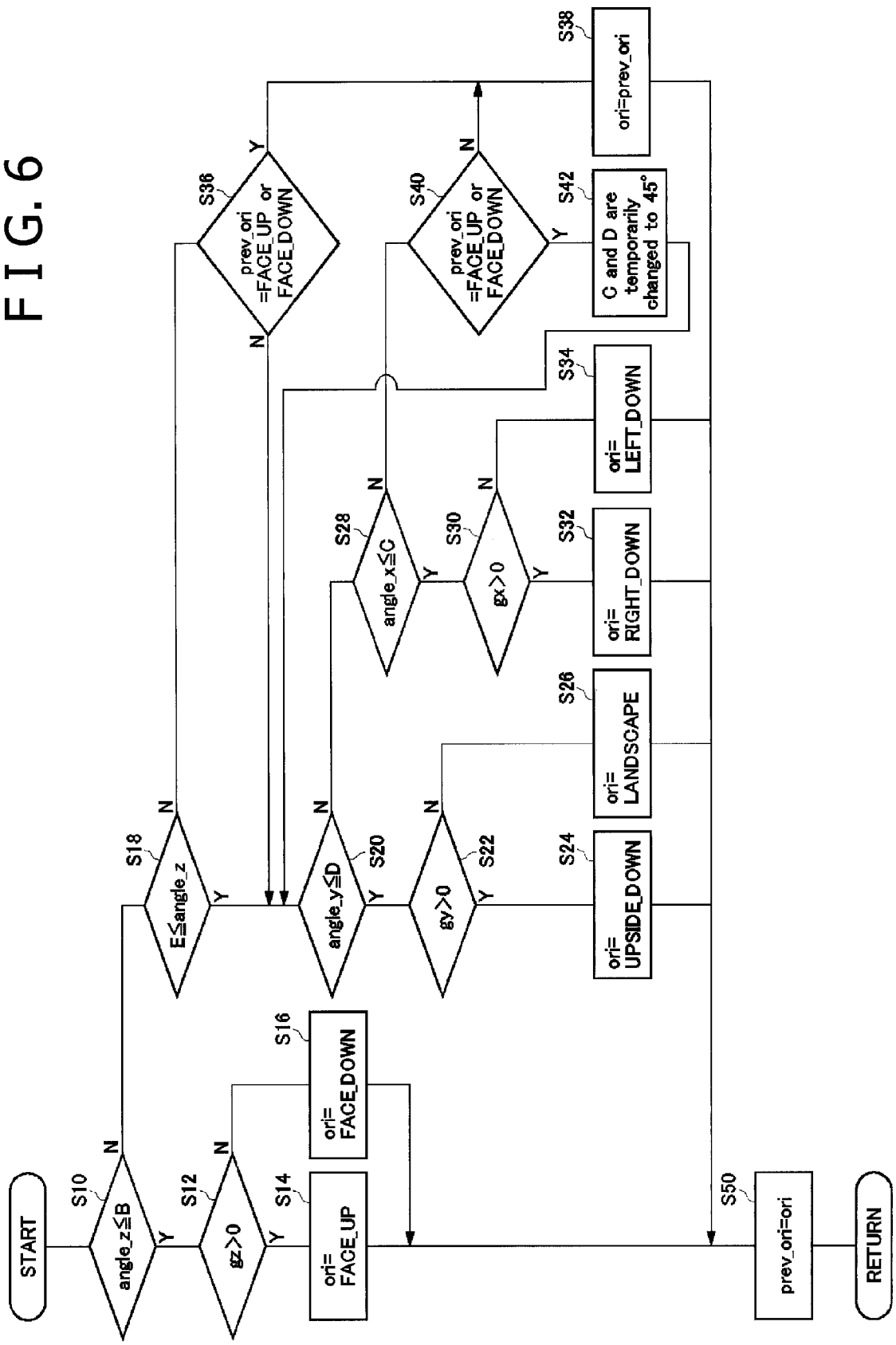
FIG. 6 is a flowchart of the orientation identification processing executed by the orientation identifier.

FIG. 6 is a flowchart of the orientation identification processing executed by the orientation identifier 122. The orientation identifier 122 carries out two-stage orientation determination. At the first stage, it is determined whether the orientation of the image processing device 10 is a horizontal orientation. If the orientation of the image processing device 10 is not a horizontal orientation, the determination proceeds to the second stage. At the second stage, it is determined which of the following orientations as the inclined orientations the orientation of the image processing device 10 is: lateral (LANDSCAPE) orientation shown in FIG. 4(*a*); lateral upside-down (LANDSCAPE_UPSIDE_DOWN) orientation shown in FIG. 4(*b*); longitudinal left-down (POR-TRAIT_LEFT_DOWN) orientation shown in FIG. 4(*c*); and longitudinal right-down (PORTRAIT_RIGHT_DOWN) orientation shown in FIG. 4(*d*). In the flowchart shown in FIG. 6, the lateral upside-down (LANDSCAPE_UPSIDE_DOWN) orientation is represented as "UPSIDE_DOWN." In addition, the longitudinal left-down (PORTRAIT_LEFT_DOWN) orientation is represented as "LEFT_DOWN," and the longitudinal right-down (PORTRAIT_RIGHT_DOWN) orientation is represented as "RIGHT_DOWN." The orientation identification processing is repeatedly executed with a predetermined cycle.

FIG. 5(*b*) is a diagram for explaining determination processing of the first stage. At the first stage, the orientation identifier 122 determines whether the angle formed by the vector G and the Z-axis (angle_z) is equal to or smaller than an angle B (S10). The angle B is set to e.g. 10 degrees. If angle_z is equal to or smaller than the angle B (Y of S10), it is identified that the image processing device 10 is in a horizontal orientation. Subsequently, the orientation identifier 122 determines whether the Z-axis component of the vector G (gz) is positive or negative (S12). If gz is positive (Y of S12), the orientation identifier 122 identifies that the present orientation (ori) is the face-up (FACE_UP) orientation (S14). If gz is negative (N of S12), it identifies that the present orientation (ori) is the face-down (FACE_DOWN) orientation (S16). The identified orientation (ori) is stored as the immediately-previous orientation (prev_ori) for the next orientation identification processing (S50). In this case, the present orientation identification processing ends at the first stage and the next orientation identification processing is started from S10.

If angle_z is larger than the angle B (N of S10), transition to determination processing of the second stage is made. In FIG. 5(*b*), a state in which angle_z is larger than the angle B is shown. FIG. 5(*c*) is a diagram for explaining the determination processing of the second stage.

At the second stage, the orientation identifier 122 determines whether angle_z is equal to or larger than an angle E (S18). The angle E is set to e.g. 20 degrees (angle A is 70 degrees). If angle_z is equal to or larger than the angle E (Y of S18), it is determined that the image processing device 10 is in an inclined orientation. Subsequently, the orientation identifier 122 determines whether the angle formed by the vector accel_xy and the Y-axis (angle_y) is equal to or smaller than an angle D (S20). The angle D is set to e.g. 25 degrees. If angle_y is equal to or smaller than the angle D (Y of S20), the orientation identifier 122 determines whether the Y-axis component of the vector G (gy) is positive or negative (S22). If gy is positive (Y of S22), the orientation identifier 122 identifies that the present orientation (ori) is the lateral upside-down (LANDSCAPE_UPSIDE_DOWN) orientation (S24). If gy is negative (N of S22), it identifies that the present orientation (ori) is the lateral (LANDSCAPE) orientation (S26). The identified orientation (ori) is stored as the immediately-previous orientation (prev_ori) for the next orientation identification processing (S50).

On the other hand, if angle_y is larger than the angle D (N of S20), the orientation identifier 122 determines whether the angle formed by the vector accel_xy and the X-axis (angle_x) is equal to or smaller than an angle C (S28). The angle C is set to e.g. 25 degrees. If angle_x is equal to or smaller than the angle C (Y of S28), the orientation identifier 122 determines whether the X-axis component of the vector G (gx) is positive or negative (S30). If gy is positive (Y of S30), the orientation identifier 122 identifies that the present orientation (ori) is the longitudinal right-down (PORTRAIT_RIGHT_DOWN) orientation (S32). If gx is negative (N of S30), it identifies that the present orientation (ori) is the longitudinal left-down (PORTRAIT_LEFT_DOWN) orientation (S34). The identified orientation (ori) is stored as the immediately-previous orientation (prev_ori) for the next orientation identification processing (S50).

Referring to FIG. 5(*b*), if angle_z is larger than the angle B and smaller than the angle E (N of S18), it is determined whether the immediately-previous orientation (prev_ori) is a horizontal orientation (S36). That is, in S36, it is determined whether or not angle_z is in the process of reaching the angle E from the state in which it is equal to or smaller than the angle B. If the immediately-previous orientation is a horizontal orientation (Y of S36), the present orientation (ori) is continuously set to the immediately-previous orientation (prev_ori) (S38). Therefore, if angle_z has become larger than the angle B from the state in which it is equal to or smaller than the angle B but is still smaller than the angle E, the present orientation is identified to be identical to the immediately-previous orientation. By forming a neutral zone between the angle B and the angle E to prevent continuity of the boundary of the determination in S10 and S18 in this manner, a situation in which the identified orientation is frequently switched between a horizontal orientation and an inclined orientation can be avoided. On the other hand, if the immediately-previous orientation (prev_ori) is not a horizontal orientation (N of S36), the determination processing of the second stage from S20 is executed.

Referring to FIG. 5(*c*), if angle_y is larger than the angle D and angle_x is larger than the angle C (N of S28), it is determined whether the immediately-previous orientation (prev_ori) is a horizontal orientation (S40). If the immediately-previous orientation (prev_ori) is not a horizontal orientation (N of S40), the present orientation (ori) is continuously set to the immediately-previous orientation (prev_ori) (S38). Therefore, if angle_y has become larger than the angle D from the immediately-previous state in which it is equal to or smaller than the angle D (lateral upside-down (LAND-SCAPE_UPSIDE_DOWN) orientation or lateral (LAND-SCAPE) orientation), the present orientation is identified to be identical to the immediately-previous orientation. Similarly, if angle_x has become larger than the angle C from the immediately-previous state in which it is equal to or smaller than the angle C (longitudinal right-down (POR-TRAIT_RIGHT_DOWN) orientation or longitudinal left-down (PORTRAIT_LEFT_DOWN) orientation), the present orientation is identified to be identical to the immediately-previous orientation. By forming a neutral zone to prevent continuity of the boundary of the determination in S20 and S28 in this manner, a situation in which the identified orientation is frequently switched can be avoided.

On the other hand, if the immediately-previous orientation (prev_ori) is a horizontal orientation (Y of S40), the orientation identifier 122 needs to identify the orientation of the image processing device 10 as any of the inclined orientations because it has been already known that the present orientation is not a horizontal orientation. For this purpose, the boundary of the determination in S20 and S28 is made continuous, that is, the angle C and the angle D are each temporarily set to 45 degrees, and the steps from S20 are carried out again. Thereby, the orientation identifier 122 identifies the present orientation. After the orientation is identified, the angle C and the angle D are returned to the original value (25 degrees).

In the above-described manner, the orientation identifier 122 identifies the orientation of the image processing device 10. When the image processing device 10 changes from an inclined orientation to a horizontal orientation, the orientation identifier 122 holds, in the main memory 44, inclined orientation information that is immediately previous to the change to the horizontal orientation. The immediately-previous inclined orientation information is information to identify any of the lateral orientation, the lateral upside-down orientation, the longitudinal left-down orientation, and the longitudinal right-down orientation among the inclined orientations. For example, if the inclined orientation immediately previous to the change to the horizontal orientation is the lateral orientation, the orientation identifier 122 continues to hold, in the main memory 44, information (immediately-previous inclined orientation information) indicating that the immediately-previous inclined orientation is the lateral orientation while the horizontal orientation is kept. Upon change of the image processing device 10 from the horizontal orientation to an inclined orientation, the orientation identifier 122 deletes the immediately-previous inclined orientation information from the main memory 44. At the time of camera activation, the lateral orientation is set as the initial value of the immediately-previous inclined orientation information.

The direction identifier 124 identifies the direction of the image processing device 10 by using a detection value of the geomagnetic sensor 26. Specifically, it identifies the photographing direction of the imager, i.e. the angle formed by the optical axis of the imager and the north direction. The geomagnetic sensor 26 detects a magnetic vector of three axes and the respective axes are the same as those of the acceleration sensor. The direction identifier 124 derives the north direction from a detection value of the geomagnetic sensor 26 and identifies the direction (azimuthal angle) of the lens optical axis on the basis of the north direction. Specifically, the direction identifier 124 identifies the azimuthal angle of the lens optical axis (photographing direction) when the north is defined as the basis (0 degrees) in a range of 0 to 360 degrees. The lens optical axis corresponds to the Z-axis direction of the geomagnetic sensor 26 (acceleration sensor).

At this time, if the lens optical axis is oriented in substantially the vertical direction, the derived base direction (north) is substantially perpendicular to the lens optical axis and therefore it is difficult for the direction identifier 124 to stably identify the azimuthal angle of the lens optical axis direction. In this case, if the direction identifier 124 identifies the azimuthal angle of the lens optical axis only from a detection value of the geomagnetic sensor 26, even a case possibly occurs in which the direction identifier 124 identifies the azimuthal angle as the west at certain timing and identifies it as the east at the next timing due to variation in the detection value of the geomagnetic sensor 26 although the orientation of the image processing device 10 hardly changes. So, the direction identifier 124 identifies the azimuthal angle of the lens optical axis direction by using also the orientation information identified by the orientation identifier 122.

Specifically, the direction identifier 124 sets a direction for defining the azimuthal angle with respect to the base direction (north) depending on whether the image processing device 10 is in a horizontal orientation or an inclined orientation. If the image processing device 10 is in an inclined orientation, the Z-axis component detected by the acceleration sensor includes a horizontal direction component. Thus, the direction identifier 124 identifies the azimuthal angle of the lens optical axis by using the Z-axis direction.

On the other hand, if the image processing device 10 is in a horizontal orientation, the direction identifier 124 identifies the azimuthal angle of the lens optical axis by using the immediately-previous inclined orientation information held in the main memory 44 by the orientation identifier 122 without using the Z-axis direction. Hereinafter, when the four sides of the display are defined with the lateral orientation shown in FIG. 4(*a*), the display is surrounded by upper longer side, right shorter side, lower longer side, and left shorter side.

For example, if the immediately-previous inclined orientation information indicates that the immediately-previous orientation is the lateral orientation or the lateral upside-down orientation, the direction identifier 124 substitutes the Y-axis direction shown in FIG. 5 for the lens optical axis to derive the angle formed by the Y-axis and the north. If the image processing device 10 is in the lateral orientation (see FIG. 4(*a*)), the upper longer side of the display is the top side. Therefore, if the image processing device 10 took the lateral orientation before becoming the horizontal orientation, the direction perpendicularly extending from the upper longer side of the display (Y-axis positive direction) is set as the basis of the azimuthal angle. Furthermore, if the image processing device 10 is in the lateral upside-down orientation (see FIG. 4(*b*)), the lower longer side of the display is the top side. Therefore, if the image processing device 10 took the lateral upside-down orientation before becoming the horizontal orientation, the direction perpendicularly extending from the lower longer side of the display (Y-axis negative direction) is set as the basis of the azimuthal angle. As above, if the image processing device 10 took the lateral orientation or the lateral upside-down orientation before becoming a horizontal orientation, the direction identifier 124 can stably identify the azimuthal angle of the lens optical axis by setting a direction perpendicular to the longer sides of the display (Y-axis direction) as the basis of the azimuthal angle derivation.

Furthermore, if the immediately-previous inclined orientation information indicates that the immediately-previous orientation is the longitudinal left-down orientation or the longitudinal right-down orientation, the direction identifier 124 substitutes the X-axis shown in FIG. 5 for the lens optical axis to derive the angle formed by the X-axis and the north. If the image processing device 10 is in the longitudinal left-down orientation (see FIG. 4(*c*)), the right shorter side of the display is the top side. Therefore, if the image processing device 10 took the longitudinal left-down orientation before becoming the horizontal orientation, the direction perpendicularly extending from the right shorter side of the display (X-axis positive direction) is set as the basis of the azimuthal angle. Furthermore, if the image processing device 10 is in the longitudinal right-down orientation (see FIG. 4(*d*)), the left shorter side of the display is the top side. Therefore, if the image processing device 10 took the longitudinal right-down orientation before becoming the horizontal orientation, the direction perpendicularly extending from the left shorter side of the display (X-axis negative direction) is set as the basis of the azimuthal angle. As above, if the image processing device 10 took the longitudinal left-down orientation or the longitudinal right-down orientation before becoming a horizontal orientation, the direction identifier 124 can stably identify the azimuthal angle of the lens optical axis by setting a direction perpendicular to the shorter sides of the display (X-axis direction) as the basis of the azimuthal angle derivation.

As described above, when the image processing device 10 is in a horizontal orientation, the direction identifier 124 identifies the direction of the image processing device 10 by using the immediately-previous inclined orientation information held in the main memory 44. Specifically, the direction identifier 124 identifies the direction of the image processing device 10 based on the direction perpendicular to the top side of the display identified by the immediately-previous inclined orientation information. Once being held in the main memory 44, the immediately-previous inclined orientation information is not changed until the orientation of the image processing device 10 changes from the horizontal orientation to an inclined orientation. Therefore, the basis of the azimuthal angle derivation is not changed while the image processing device 10 is in the horizontal orientation, which makes it possible to stably identify the azimuthal angle of the lens optical axis. Consequently, because the base direction of the azimuthal angle derivation is not changed while the image processing device 10 keeps the horizontal orientation even when the orientation of the image processing device 10 somewhat changes, the azimuthal angle that has high reliability and allows the user to have a feeling of consent at the time of picture viewing can be derived.

When an accepting section 102 accepts an order to acquire image data by the user, input from the input device 20 and the touch panel 69, in the photographing mode, it issues an operation order to the image data acquirer 104 and the sensor information processor 120. Upon receiving the operation order, the image data acquirer 104 acquires image data expanded on the main memory 44 and compresses it in the JPEG format.

In the photographing mode, the orientation identifier 122 cyclically executes the orientation identification processing by using a detection value of the three-axis acceleration sensor. The orientation identifier 122 identifies the orientation of the image processing device 10 with a predetermined cycle and supplies, to an attached information generator 108, orientation information of the timing when the operation order is received. If the identified orientation indicates a horizontal orientation, the immediately-previous inclined orientation information held in the main memory 44 is supplied to the attached information generator 108.

Furthermore, the direction identifier 124 identifies the direction of the image processing device 10 by using a detection value of the geomagnetic sensor 26 and the orientation information identified by the orientation identifier 122, and supplies the identified direction information to the attached information generator 108.

The attached information generator 108 generates an Exif file by using the orientation information and the direction information supplied from the sensor information processor 120, GPS measurement information obtained by measurement by the GPS controller 60, and so forth. In the Exif file format, the image direction (Orientation) is defined as one of tags relating to the configuration of image data. The image direction is information indicating from which point and in which direction the image data is recorded. The attached information generator 108 sets the tag value of the image direction based on the orientation information or the immediately-previous inclined orientation information. Furthermore, the attached information generator 108 sets the tag value of the photographing direction (GPSImgDirection) based on the direction information.

An image file generator 106 compiles the image data compressed by the image data acquirer 104 and the Exif file generated by the attached information generator 108 to generate one image file. This generates the image file in which the orientation information identified by the orientation identifier 122 and the direction information identified by the direction identifier 124 are associated with the image data. The image file generator 106 records the generated image file in the recording medium 80.

The above is the generation processing of the image file in the photographing mode. The generation processing of the image file in the application mode will be described below.

In the application mode, the application executing section 100 runs a game program and the display controller 110 makes the display unit 68 display game image data buffered in the frame buffer 112. When accepting an order to generate a screen shot from the user, the accepting section 102 issues an operation order to the image data acquirer 104 and the sensor information processor 120. Upon receiving the operation order, the image data acquirer 104 acquires image data expanded on the frame buffer 112 and compresses it in the JPEG format.

In the sensor information processor 120, the orientation identifier 122 executes the orientation identification processing by using a detection value of the three-axis acceleration sensor. The orientation identifier 122 identifies the orientation of the image processing device 10 and supplies the identified orientation information to the attached information generator 108. If the identified orientation indicates a horizontal orientation, the immediately-previous inclined orientation information held in the main memory 44 is supplied to the attached information generator 108.

Furthermore, the direction identifier 124 identifies the direction of the image processing device 10 by using a detection value of the geomagnetic sensor 26 and the orientation information identified by the orientation identifier 122, and supplies the identified direction information to the attached information generator 108.

The attached information generator 108 generates an Exif file by using the orientation information and the direction information supplied from the sensor information processor 120, GPS measurement information obtained by measurement by the GPS controller 60, and so forth. The image file generator 106 compiles the image data compressed by the image data acquirer 104 and the Exif file generated by the attached information generator 108 to generate one image file. This generates the image file in which the orientation information identified by the orientation identifier 122 and the direction information identified by the direction identifier 124 are associated with the image data. The image file generator 106 records the generated image file in the recording medium 80.

Conventionally, attached information at the time of photographing of a screen shot is not associated with the image data of the screen shot. In particular, in the case of electronic apparatus like a game machine, its orientation when it is grasped by the user is almost fixed and therefore the necessity of inclusion of the image direction (Orientation) of the Exif file in the screen shot is also little. However, the image processing device 10 of the present embodiment allows orientation information identified by the orientation identifier 122 to be included in the Exif file of a screen shot. Due to this, even in the case of the emergence of a game played with the image processing device 10 longitudinally grasped by the user, a viewer can properly reproduce the image data of the screen shot with the image direction employed at the time of the photographing of the screen shot.

The present invention is explained above based on the embodiment. This embodiment is exemplification and it will be understood by those skilled in the art that various modification examples can be made in the combinations of the respective constituent elements and the respective processing processes thereof and such modification examples are also within the scope of the present invention.

In the embodiment, the orientation identifier 122 identifies whether the image processing device 10 is in a horizontal orientation or an inclined orientation by the procedure shown in FIG. 6. In a modification example, the orientation identifier 122 may simply determine whether or not the image processing device 10 is in a horizontal orientation based on only the result of the determination step of S10.

REFERENCE SIGNS LIST

10 . . . Image processing device, 25 . . . Motion sensor, 26 . . . Geomagnetic sensor, 44 . . . Main memory, 65 . . . Imaging controller, 68 . . . Display unit, 69 . . . Touch panel, 80 . . . Recording medium, 100 . . . Application executing section, 102 . . . Accepting section, 104 . . . Image data acquirer, 106 . . . Image file generator, 108 . . . Attached information generator, 110 . . . Display controller, 112 . . . Frame buffer, 120 . . . Sensor information processor, 122 . . . Orientation identifier, 124 . . . Direction identifier, 130 . . . Memory section.

INDUSTRIAL APPLICABILITY

The present invention can be applied to a technical field to generate an image file.

The invention claimed is:

1. An image processing device that generates an image file, comprising:
an accepting section that accepts an acquisition order of image data;
an acquirer that acquires image data if the accepting section receives the acquisition order;
an orientation identifier that identifies an orientation of the image processing device by using a detection value of an acceleration sensor;
a direction identifier that identifies direction of the image processing device by using a detection value of a geomagnetic sensor and orientation information identified by the orientation identifier; and
a file generator that generates an image file in which direction information identified by the direction identifier is associated with the image data,
wherein the orientation identifier determines whether the image processing device is in a horizontal orientation or an inclined orientation,
wherein the image processing device is in a horizontal orientation when a detected angle z is less than or equal to a first predetermined angle B and the image processing device is in an inclined orientation when angle z is greater than or equal to a second predetermined angle E, the second predetermined angle E being greater than the first predetermined angle B,
and, if the image processing device is in the inclined orientation, the direction identifier identifies the direction of the image processing device based on the detection value of the geomagnetic sensor and lens optical axis direction,
wherein if the image processing device is in the horizontal orientation, the direction identifier identifies the direction of the image processing device based on the detection value of the geomagnetic sensor and a predetermined direction perpendicular to the lens optical axis direction in the image processing device, and
wherein, in the horizontal orientation, the image processing device is in a face up or a face down orientation,
wherein, if the first predetermined angle B is less than the detected angle z, if the detected angle z is less than the second predetermined angle E, and a previous orientation was the horizontal orientation, the direction identifier identifies the direction of the image processing device by using the previous orientation, and if the previous orientation was not the horizontal orientation, the direction identifier identifies the direction of the image processing device as the inclined orientation,
wherein the direction identifier further identifies a second detected angle y different than the first detected angle z,
if the second detected angle y is less than or equal to a third predetermined angle D and the second detected angle y is greater than zero, the direction identifier identifies the inclined orientation as an upside down orientation, and
if the second detected angle y is less than or equal to the third predetermined angle D and the second detected angle y is less than or equal to zero, the direction identifier identifies the inclined orientation as a landscape orientation.

2. The image processing device according to claim 1, wherein the direction identifier identifies an azimuthal angle of lens optical axis direction as the direction of the image processing device.

3. The image processing device according to claim 1, wherein, if the detected angle z is greater than zero, the direction identifier identifies the horizontal orientation as a face up orientation, and
if the detected angle z is less than or equal to zero, the direction identifier identifies the horizontal orientation as a face down orientation.

4. The image processing device according to claim 1, wherein the direction identifier further identifies a third detected angle x different than the first detected angle z and the second detected angle y,
if the second detected angle y is greater than the third predetermined angle D, the third detected angle x is less than or equal to a fourth predetermined angle C, and the third detected angle x is greater than zero, the direction identifier the direction identifier identifies the inclined orientation as a right down orientation, and
if the second detected angle y is greater than the third predetermined angle D, the third detected angle x is less than or equal to the fourth predetermined angle C, and the third detected angle x is less than or equal to zero, the direction identifier identifies the inclined orientation as a left down orientation.

5. A non-transitory computer readable medium having stored thereon a program for causing a computer incorporated in a chassis to execute:
a function to accept an acquisition order of image data;
a function to acquire image data if the acquisition order is accepted;
a function to identify an orientation of the chassis by using a detection value of an acceleration sensor;
a function to identify a direction of the chassis by using a detection value of a geomagnetic sensor and identified orientation information; and
a function to generate an image file in which identified direction information is associated with the image data,
wherein the function to identify an orientation of the chassis determines whether the chassis is in a horizontal orientation or an inclined orientation,
wherein the chassis is in a horizontal orientation when a detected angle z is less than or equal to a first predetermined angle B and the chassis is in an inclined orientation when angle z is greater than or equal to a second predetermined angle E, the second predetermined angle E being greater than the first predetermined angle B,
and, if the chassis is in the inclined orientation, the function to identify the direction of the chassis identifies the direction of the chassis based on the detection value of the geomagnetic sensor and lens optical axis direction, and wherein if the chassis is in the horizontal orientation, the function to identify the direction of the chassis identifies the direction of the chassis based on the detection value of the geomagnetic sensor and a predetermined direction perpendicular to the lens optical axis direction, wherein, in the horizontal orientation, the lens optical axis is substantially parallel to a normal line extending from a floor, and wherein, if the first predetermined angle B is less than the detected angle z, if the detected angle z is less than the second predetermined angle E, and a previous orientation was the horizontal orientation, the direction of the chassis is set using the previous orientation, and if the previous orientation was not the horizontal orientation, the direction of the chassis is set as the inclined orientation, wherein the function to identify the direction of the chassis further identifies a second detected angle different than the first detected angle z, if the second detected angle y is less than or equal to a third predetermined angle D and the second detected angle y is greater than zero, the function to identify the direction of the chassis identifies the inclined orientation as an upside down orientation, and if the second detected angle y is less than or equal to the third predetermined angle D and the second detected angle y is less than or equal to zero, the function to identify the direction of the chassis identifies the inclined orientation as a landscape orientation.

* * * * *